May 7, 1968    B. C. COAD    3,382,054
LOW MELTING POINT COMPOSITE MATERIALS USEFUL FOR
BRAZING, SOLDERING OR THE LIKE
Original Filed March 18, 1960

Inventor,
Brian C. Coad,
by Harold Levine
Att'y.

United States Patent Office 3,382,054
Patented May 7, 1968

3,382,054
LOW MELTING POINT COMPOSITE MATERIALS USEFUL FOR BRAZING, SOLDERING OR THE LIKE
Brian C. Coad, Attleboro, Mass., assignor to Texas Instruments Incorporated, Dallas, Tex., a corporation of Delaware
Continuation of application Ser. No. 15,937, Mar. 18, 1960. This application Jan. 25, 1965, Ser. No. 432,056
8 Claims. (Cl. 29—195)

ABSTRACT OF THE DISCLOSURE

This invention provides as a brazing or soldering product an adhered or physically bonded non-alloyed substantially malleable assembly of brittle alloy forming components, one of which comprises a malleable metal and the other of which comprises a frangible brittle metalloid or non-metallic material in a proportion adapted upon firing in situ for brazing or soldering to form a low temperature alloy as the firing proceeds whereby the product before firing does not have the brittle characteristics of the resulting alloy. The term low-melting point alloy means one having its components in such proportions by weight that the melting point is lower than that having the higher melting point and may or may not be less than that of the component having the lower melting point. Examples of component combinations are gold-silicon, gold-germanium, and nickel-boron.

---

This application is a continuation of U.S. application Ser. No. 15,937, filed Mar. 18, 1960 in the name of Brian C. Coad and entitled, "Low Melting Point Materials Useful for Brazing, Soldering or the Like," now abandoned.

This invention relates generally to low-melting point materials and to a method of their manufacture, and more particularly to low-melting point alloys.

Among the several objects of the invention may be noted the provision of composite materials having components adapted to be alloyed and simultaneously form low-melting point brazed or soldered joints between parts to be connected; the provision of composite materials of the class described which, although formed of components subject to embrittlement when alloyed, nevertheless have at least one malleable component in the composite state and the other component being brittle or frangible preceding alloying by firing to solder or braze; the provision of materials of the class described which by a convenient and low-cost but accurate method of manufacture are produced in forms for nonbreakable transportation, and conversion thereafter by forming, punching, bending and the like into shapes desirable for soldering and brazing at predictable low-melting point temperatures; and the provision of composite materials which are adapted to be adhered to a backing member and can be alloyed in approximately final sized form to form a low-melting point solder or brazing alloy. Other objects and features will be in part apparent and in part pointed out hereinafter.

The invention accordingly comprises the combinations of components, the proportions thereof, steps and sequence of steps, and features of compositions and manipulation, which will be exemplified in the products and methods hereinafter described, and the scope of which will be indicated in the following claims.

In the accompanying drawings, in which several of various possible embodiments of the invention are illustrated:

Corresponding reference characters indicate corresponding parts throughout the several views of the drawing.

The term low-melting point alloy, as it is applicable to the materials to which the invention relates, is defined herein as one having its components in such proportions by weight that the melting point is lower than that of the component having the higher melting point and may or may not be less than that of the component having the lower melting point. Such low melting point may, for example, be the eutectic temperature for a given system of alloys. It will be understood by those skilled in the art that metallurgical phase diagrams are commonly available in the literature for determining the various melting temperatures resulting from various component weight ratios which make up a given alloy, for the practice of the instant invention.

Among low-melting point alloys useful for low-temperature brazing or soldering are some which are nonmalleable, i.e., brittle and liable to crack and break, especially in thin layers, thus considerably reducing their usefulness as brazing or soldering products in sheet, ribbon, or other forms, although embrittlement after a soldering or brazing operation may be of no consequence to their function as a joint between the parts joined thereby. Gold-silicon, gold-germanium, and nickel-boron alloys are examples. Specifically, fine gold and substantially pure silicon, above mentioned, for example, will produce a brittle alloy when mixed by weight in the proportion of 94 gold to 6 silicon and also in other low-melting point proportions within the definition of a low-melting point alloy above given. Such low-melting point alloys to which the instant invention relates generally include one component comprising a malleable metal, i.e., gold, nickel, and has for its other component, a frangible, brittle, nonmetallic, metal-like material, i.e., silicon, germanium, boron. Such non-metallic or metal-like materials may be characterized as metalloids in that this class of materials resembles typical metals in certain properties only.

The general purpose of the invention is to provide, as a brazing or soldering product, an adhered or physically bonded nonalloyed substantially malleable assembly of brittle allow forming components, one of which comprises a malleable metal and the other of which comprises a frangible brittle metalloid or non-metallic material as hereinabove defined, in a proportion adapted, upon firing in situ for brazing or soldering, to form a low temperature alloy as the firing proceeds whereby the product before firing does not partake of the brittle characteristics of the resultant alloy.

Figure 1:
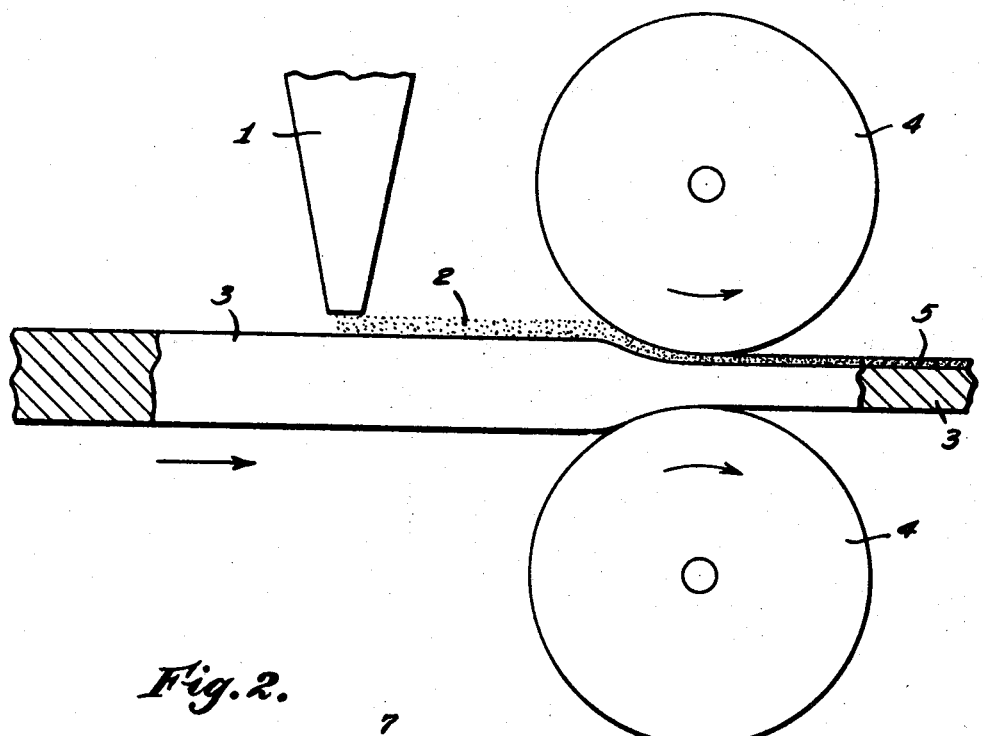
FIG. 1 is a more or less diagrammatic view showing one component of a frangible metalloid or nonmetallic material in particulate or comminuted form being deposited on a length of a component of malleable metal and being adhered thereto under the squeezing action of a pair of rolls.

One example of the invention is illustrated in FIG. 1 in the drawings. Referring now to FIG. 1, a block, sheet, strip or the like 3 of malleable metal, such as for example, gold or nickel, is provided on one surface thereof, with a layer of frangible non-metallic material or a frangible metalloid in particulate or comminuted form, i.e. silicon, germanium, boron, by means of a hopper 1. After the particulate frangible material 2 is deposited over the surface of malleable metal layer 3 by hopper 1, the assembly is moved in the direction of the arrow shown in this figure, and is squeezed together by rolls 4, 4. The comminuted material 2, being frangible, will be pulverized during this squeezing to the extent it is not already pulverized when deposited on the metal layer 3 preparatory to squeezing. The amount of reduction by rolling required to effect a bond between the frangible material and the malleable metal layers varies with the particular respective components, but this of course is readily determinable for any given set of components by actually rolling the latter together. In most cases, a reduction of approximately 50% is required to produce a layer of the metalloid material bonded to a layer of a malleable metal sufficiently well that the bond will not be disrupted by normal handling or slight bending. In most cases, a total reduction of 80% to 85% results in a sufficiently good bond between the frangible material and the malleable metal that the composite stock can be severely mechanically worked, such as by drawing, milling, slitting, stamping, punching, etc. without disruption of the bond. In preparing the malleable metal component 3 to be bonded to the frangible layer or component 2, each of the components should be substantially free of grease and any other bond deterring contaminants. No involved preparation of the surface of the malleable metal layer 3 to be bonded is ordinarily necessary. In most cases, the surface of the metal layer to be bonded is satisfactorily cleaned by scratch brushing or otherwise abrading, and oftentimes, metal stock taken from the shelf can be bonded as it is by the methods herein described.

The method thus diagramatically illustrated in FIG. 1 includes the steps of disposing frangible metalloid or non-metallic material against a surface of the malleable metal layer 3, and rolling the two together with a sufficient reduction to provide a layer of the frangible metalloid material bonded to the malleable metal component 3. The frangible metalloid material, which is deposited in comminuted form, can be mixed with a carrier such as water to provide a slurry, which can then be sprayed onto the surface and the carrier evaporated off prior to squeezing, so as to possibly afford a more accurate quantity control. A method of bonding a frangible non-metallic material to a malleable base layer similar to the method discussed hereinabove, is described in greater detail in U.S. Patent No. 3,087,240 filed Sept. 29, 1958, in the name of Marshall W. Gross and assigned to the assignee of the instant application.

The cohered layer 5 of the frangible metalloid material which is bonded to the malleable metal layer 3 is in the form of a continuous layer, as distinguished from separate bits or pieces individually bonded to the metal layer. It can therefore logically be concluded that the comminuted particles of the pulverized frangible metalloid material bond not only to the malleable metal layer, but to each other as a result of the final reduction by rolling. It should be understood that the reduction rolling to provide the desired adherence between the layers may be carried out in successive passes and intermediate heat-treating steps may also be applied, as will be more specifically described in the examples to be given below.

The ratio of total thickenesses of the malleable metal layer 3 and the frangible metalloid layer or component 5 are selected so as to provide a desired weight ratio of the frangible metalloid material to the malleable metal so as to provide a low-melting point alloy, within the definition above given, when fired. Their absolute thicknesses are not critical, being such as to provide an ultimate desirable area of composite material after reduction in thickness and a desired weight ratio between components. Exemplary desirable weight ratios will be given below for gold-silicon, gold-germanium and nickel-boron.

It should be understood that while stretch-off, which may be encountered with the materials of the instant invention will be minimal, the effect on the weight ratio of stretch-off may be determined and the loss occasioned thereby initially supplied by providing an excess of the stretch-off material at the beginning of the process so as to make up for the stretch-off loss and produce the finished product in the desired weight ratio upon completion of the process. The following is an example of a product made in accordance with the practice of the instant invention relating to gold and silicon.

Example A

A malleable layer 3 of gold at 0.050" was provided and a layer of silicon powder 2 was spread and disposed against one surface of the gold layer at a thickness of 0.040". The silicon powder had an uncompacted low bulk density of 1,245 grams per cubic centimeter which was selected so as to provide a cohered dense desired weight ratio to gold to form a gold-silicon weight ratio of 94:6. The uncompacted silicon powder and 0.050" thick gold layer were bonded together by reduction rolling to a composite thickness of 0.048". The bonded composite assembly was again reduction rolled to a thickness of 0.028". The composite material was then heated treated for one hour at a temperature of 660° F. in a neutral atmosphere, for example, such as argon. The composite material was then further reduction rolled to a final thickness of 0.018" and was again heat treated for one hour at 660° F. in a neutral or reducing atmosphere.

Another example which will supply additional information in regard to the practice of the instance invention is as follows:

Example B

Figure 2:
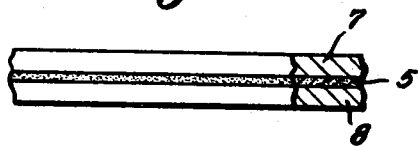
FIG. 2 is an end view, partially in section, illustrating the new product according to a second embodiment of the instant invention.
Figure 3:
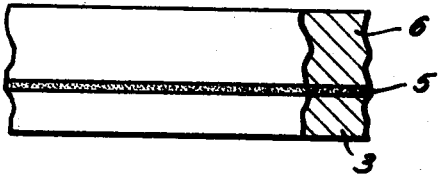
FIG. 3 is an end view, partially in section, illustrating another new product according to yet another embodiment of the instant invention.

Two strips of composite material, a silicon layer on gold such as that described above in Example A, were assembled with the outer silicon surfaces in abutting relation. The assembly was bonded together by rolling under pressure produced by a suitable reduction in thickness to provide a bond between the respective silicon layers. An example of a bonding method which may be used is disclosed in U.S. Patents 2,691,815 and 2,753,623. A one-pass reduction of 50% to 60% or so in thickness of the assembly has been found sufficient, although more may be used to establish a solid-phase bond which holds the composite strips together as a unitary composite sheet or strip considerably enlarged in area over that of the individual composite members before bonding. Such a product is illustrated in FIG. 2 wherein layers 7 and 8 are gold and layer 5 is silicon. It will be understood that the relative thicknesses of the gold layers 7, 8 and silicon 5 are such as will produce the desired weight ratio for the desired low-melting point alloy when fired. It is to be further understood that the product illustrated in FIG. 2 can also be made by bonding a layer of gold to a silicon-gold composite product described above in Example A, by methods such as those disclosed in U.S. Patents 2,691,815 and 2,753,623. A further example of a product made according to the instant invention is illustrated in FIG. 3. There are many applications where it is desirable to adhere the low-melting point alloy in its unfired condition to a backing sheet, such as for example, molybdenum or 24 karat gold and to fire such a composite material to form the low-melting point alloy or eutectic (if eutectic weight ratio proportions are employed). An example of such applications is in use with transistors where a transistor tab is to be soldered or adhered to a transistor crystal. For example, the gold-silicon low-melting point alloy is particularly useful with silicon crystal type transistors which are to be adhered to a molybdenum tab. The silicon containing low-melting point brazing alloy tends to obviate, or at least minimize, dissolution of the silicon crystal by the gold.

Referring now to FIG. 3, a backing sheet or layer 6, i.e., molybdenum or 24 karat gold may be bonded to or adhered to the composite product, such as shown in FIG. 1, which may comprise a layer of silicon 5 bonded to a layer of gold 3. Layer or component 6 may be bonded to the frangible layer 5 of the composite product, in its unfired form, by rolling under pressure produced by a suitable reduction in thickness of the entire assembly such as, for example, disclosed in U.S. Patents 2,691,815 and 2,753,623. It should be understood that layers 3 and 5 are in the desired weight ratio for forming the desired low-melting point alloy before the product is adhered to the backing sheet 6.

Referring now to FIG. 3, wherein a composite low melting point material comprising a frangible metalloid layer 5 and a malleable metal layer 3 is bonded to a backing sheet or member 6, the frangible component is illustrated as being adhered to the backing layer 6. This arrangement is advantageous in that no portions of the frangible layer can be lost during bonding and reduction rolling whereas if malleable layer 3 were bonded to the backing layer 6, such a possibility might exist since the frangible layer would be subjected to possible mechanical damage. It is to be understood, however, that if desired, the backing layer 6 which can take the form, for example, of gold or molybdenum, could be bonded to or adhered to malleable metal layer 3. An example of the preparation of a low-melting point alloyable strip adhered to a backing layer is as follows:

Example C

A 0.018" composite gold-silicon strip having a weight ratio of 94:6 was disposed against a molybdenum strip having an initial thickness of 0.060" with the gold layer in contact with one surface of the molybdenum strip. This assembly was then roll bonded to 0.045" by the methods such as that described above and in U.S. Patents 2,691,815 and 2,753,623. The bonded assembly was then reduction rolled to a thickness of 0.030". The assembly was then heat treated for one hour at a temperature of 660° F. in a neutral or reducing atmosphere such as argon, for example. The assembly was then further reduction rolled to a thickness of 0.017" and was again heat treated for one hour in the manner described above. The assembly was then further reduction rolled to a thickness of 0.009" and was then heat treated for one-half hour at 1000° F. in a neutral or reducing atmosphere such as argon. This latter heat treatment was sufficient to form an alloy between the gold and silicon components and formed a eutectic of this material near its final thickness. The material was then further rolled to a thickness of 0.005" to smooth the surface. The material did not break apart at this stage because of the extreme thinness of the layers and also partly because of the molybdenum backing sheet. The final product consisted in thickness of the following proportions: the molybdenum comprised 80% of the thickness and the gold-silicon alloy, which in this case was also a eutectic, comprised 20% of the total thickness. Thus, the final thickness of the gold-silicon alloy was on the order of approximately 0.001".

Example D

This example is substantially identical to Example C described above in all respects except that the gold-silicon strip was disposed against and bonded to a molybdenum strip with the silicon layer in contact with one surface of the molybdenum strip.

It will be recognized from a phase diagram for gold and silicon that 94:6 is a low-melting point ratio for gold and silicon is alloyed. Thus the melting point of gold is 1063° C.; that of silicon is 1404° C.; and that of any 94:6 alloy that may be formed therefrom will be 370° C., the eutectic temperature, which comes within the definition of a low-melting point alloy as given above. It is to be understood, however, that other gold-silicon weight ratios may be employed which would produce, if alloyed, a low-melting point material in the sense that such an alloy would melt at a temperature different from the eutectic temperature, but lower than the melting temperature of the gold or silicon, or both, and would be a low-melting point alloy within the definition thereof, as given above. However, approximately a 94:6 weight ratio is preferable because it provides a gold-rich combination which when alloyed is desirable, and which provides a eutectic, which has a congruent or isothermal melting point, which eutectic melting point is also conveniently low.

It is pointed out that a final product, such as illustrated in FIGS. 1 or 2, consisting of a layer of silicon adhered to a layer of gold or sandwiched between two layers of gold (FIG. 2) is not in and of itself a 94:6 gold-silicon alloy, but simply a material capable of becoming one if suitably heated. Its advantage is that the multilayer composite material is not brittle, but of substantially malleable form which may be coiled, stamped, formed, punched, etc. This is true even though the product includes a frangible metalloid layer, i.e. silicon, germanium, boron. Thus the problem with materials which are brittle in alloy form is accentuated where the components include a brittle metalloid material over that where brittle alloys are formed from originally malleable constituents. Thus the material may be shipped without breakage and cut up into appropriately stamped and formed pieces for insertion between parts to be brazed or soldered. When so inserted, it is fired, i.e. heated to a temperature somewhat in excess of the low-melting point temperature of the resultant alloy but below the melting temperature of at least one of the components, and many times below the melting temperature of both of the components. Where the product is to be fired to form the alloy and is to perform the brazing or soldering function in situ, the brazing or soldering temperature should be selected to be somewhat in excess of the final melting temperature of the resultant alloy to insure complete alloying, if a condition of dissolution of all of the gold to form, for example, the 94:6 alloy is to be reached. The resultant 94:6 alloy has a melting point of 370° C., which is also the eutectic temperature. The resultant alloy formed at the temperature in excess of 370° C., upon cooling below that temperature, solidifies to hold together the pieces being brazed or soldered. At this stage, the solidified 94:6 gold-silicon alloy may be brittle, but this is inconsequential to its holding function. It will be apparent that the brazed or soldered joint may be separated at a melting temperature of 370° C.

It has been found that optimum results have been obtained when a gold-silicon eutectic composite, i.e. a 94:6 ratio (gold-silicon) is homogenized at about 0.002" in thickness. In the above example of the gold-silicon low-melting point alloy, a ratio by weight of about 94:6 of gold to silicon was employed. If the ratios had been, for example, 90:10 or 96:4, the melting point temperature at the soldering or brazing stage might have required a temperature increase on the order of about 450° C., but such alloys would, under the above definition, still be classed as low-melting point alloys. The significance of the selected 94:6 gold-silicon ratio is:

(1) Its desirable composition as a brazing or soldering material; and (2) The comparatively low-melting temperature required to carry through the alloying during the brazing or soldering process.

Examples of other materials that may be used in carrying out the invention would be gold-germanium and nickel-boron. While various weight ratios of gold to germanium and nickel to boron may be employed to produce low-melting point alloys within the definition of low-melting point alloys above, the preferred weight ratios of gold to germanium and nickel to boron are 88:12 and 96:4, respectively. Such weight ratios produce eutectics of these components and are preferable because these eutectics have a congruent or isothermal melting point, which melting point is also conveniently low. It is to be understood, however, that other gold-germanium and nickel-boron weight ratios may be employed which would produce, if alloyed, low-melting point materials in the sense that such alloys would melt at temperatures different from the eutectic temperatures, but would be lower than the melting temperautres of at least one of the constituents and would be a low-melting point alloy within the definition thereof as given above.

The above-mentioned thin characteristics of the final product, i.e., a few thousandths of an inch or so in thickness, are desirable primarily from the viewpoint of (1) providing a product which may be coiled for shipment and which is more conformable to surfaces to be joined when located in soldering position therebetween and hence also better able to wet them as melting proceeds, thereby resulting in a stronger attachment; and (2) a product which will be transformed into the alloy in a short period of heating during the brazing or soldering step. If greater thicknesses of the product are selected, correspondingly greater times of firing will be needed during the brazing or soldering step in order to complete the alloying process and therefore of course also to complete the brazing and soldering process to the desired weight ratios for the respective materials.

It is to be understood that the term "metal" as used herein is intended to also include alloys thereof.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

I claim:

1. A low melting point composite product for brazing, soldering and the like comprising adhered components of at least two different materials, alloys of which are brittle, one of the components being gold and the other being silicon; the weight ratio of the components being on the order of 94:6.

2. A low melting point composite product for brazing, soldering and the like comprising adhered components of at least two different materials, alloys of which are brittle, one of the components being gold and the other being germanium; the weight ratio of the components being on the order of 88:12.

3. A low melting point composite product for brazing, soldering and the like comprising adhered components of at least two different materials, alloys of which are brittle, one of the components being nickel and the other being boron; the weight ratio of the components being on the order of 96:4.

4. A low-melting point composite product for brazing, soldering and the like comprising a pair of layers of gold each adhered to and sandwiching therebetween a layer of silicon, a composite thickness of the adhered layers being such as to form a substantially malleable composite adapted for forming, cutting, punching operations and the like; the weight ratio of the gold to silicon being on the order of 94:6.

5. A product according to claim 1, wherein a malleable layer of metal is adhered to one of said one and other components.

6. The product according to claim 5, wherein said malleable layer comprises molybdenum and is adhered to said silicon component.

7. The product according to claim 5, wherein said malleable layer comprises molybdenum and is adhered to said gold component.

8. The product according to claim 5, wherein said malleable layer comprises substantially pure gold and said gold and silicon components are alloyed and provide a gold-silicon eutectic.

References Cited

UNITED STATES PATENTS

| | | |
|---|---|---|
| 2,438,110 | 3/1948 | Brattain. |
| 2,501,051 | 3/1950 | Henderson. |
| 2,725,617 | 12/1955 | Sternberg _____ 29—195 |
| 2,772,985 | 12/1956 | Wainer _____ 29—198 |
| 2,781,481 | 12/1957 | Armstrong _____ 148—336 X |
| 3,009,840 | 12/1961 | Emeis. |
| 3,045,334 | 7/1962 | Bezins. |
| 3,052,015 | 9/1962 | Kerstetter _____ 29—195 |
| 3,069,288 | 12/1962 | Oxx _____ 29—198 X |
| 3,087,240 | 4/1963 | Gross _____ 29—195 X |
| 3,128,545 | 4/1964 | Cooper _____ 29—195 X |

HYLAND BIZOT, *Primary Examiner.*